United States Patent
Singer et al.

(10) Patent No.: US 10,371,932 B2
(45) Date of Patent: Aug. 6, 2019

(54) LIGHT FIELD IMAGING WITH SCANNING OPTICAL UNIT

(71) Applicant: Carl Zeiss Microscopy GmbH, Jena (DE)

(72) Inventors: Wolfgang Singer, Aalen (DE); Ralf Wolleschensky, Jena (DE); Ingo Kleppe, Jena (DE); Toufic Jabbour, Aalen (DE); Michael Gölles, Jena (DE); Kai Wicker, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 70 days.

(21) Appl. No.: 15/374,319

(22) Filed: Dec. 9, 2016

(65) Prior Publication Data
US 2017/0168284 A1 Jun. 15, 2017

(30) Foreign Application Priority Data
Dec. 9, 2015 (DE) .................. 10 2015 121 403

(51) Int. Cl.
*G02B 21/36* (2006.01)
*H04N 13/254* (2018.01)
(Continued)

(52) U.S. Cl.
CPC ......... *G02B 21/367* (2013.01); *G02B 21/008* (2013.01); *G02B 21/0048* (2013.01);
(Continued)

(58) Field of Classification Search
None
See application file for complete search history.

(56) References Cited

U.S. PATENT DOCUMENTS

| 2002/0038820 A1* | 4/2002 | Check ................... G02B 26/10 235/462.14 |
| 2008/0266655 A1 | 10/2008 | Levoy et al. |

(Continued)

FOREIGN PATENT DOCUMENTS

| DE | 102013001238 A1 | 7/2014 |
| DE | 102013015931 A1 | 3/2015 |

(Continued)

OTHER PUBLICATIONS

Broxton, Michael et al., "Wave optics theory and 3-D deconvolution for the light field microscope", Optics Express OSA 25418, vol. 21, No. 21, Oct. 2013, 1-22.

(Continued)

*Primary Examiner* — Eileen M Adams
(74) *Attorney, Agent, or Firm* — Murphy, Bilak & Homiller, PLLC (57) ABSTRACT

An optical device comprises a light source and a detector, and also a sample holder, which is configured to fix an object in the optical path of light. A scanning optical unit is configured, for a multiplicity of scanning positions, in each case selectively to direct light incident from different angular ranges from the object onto the detector. On the basis of a three-dimensional light field represented by corresponding measurement data of the multiplicity of scanning positions, a spatially resolved imaging of the object is generated, said imaging comprising at least two images from different object planes of the object.

12 Claims, 8 Drawing Sheets

(51) Int. Cl.
  *G06T 7/557* (2017.01)
  *G02B 21/00* (2006.01)
  *G02B 21/02* (2006.01)
  *G02B 21/26* (2006.01)
  *G02B 27/00* (2006.01)
  *H04N 13/221* (2018.01)

(52) U.S. Cl.
  CPC .......... *G02B 21/025* (2013.01); *G02B 21/26* (2013.01); *G02B 27/0075* (2013.01); *G06T 7/557* (2017.01); *H04N 13/221* (2018.05); *H04N 13/254* (2018.05); *G06T 2207/10028* (2013.01); *G06T 2207/10052* (2013.01); *G06T 2207/10056* (2013.01); *G06T 2207/10148* (2013.01); *G06T 2207/20221* (2013.01); *G06T 2207/30024* (2013.01)

(56) References Cited

U.S. PATENT DOCUMENTS

| | | | |
|---|---|---|---|
| 2009/0125242 A1* | 5/2009 | Choi | G01N 21/45 702/19 |
| 2014/0092459 A1* | 4/2014 | Mizuta | G02B 21/002 359/201.2 |
| 2014/0263963 A1 | 9/2014 | Broxton et al. | |
| 2015/0185454 A1 | 7/2015 | Kalkbrenner et al. | |
| 2015/0205097 A1* | 7/2015 | Kudo | G02B 26/123 347/118 |
| 2016/0301915 A1* | 10/2016 | Shechtman | G02B 21/0064 |
| 2016/0327383 A1* | 11/2016 | Becker | G01B 11/005 |

FOREIGN PATENT DOCUMENTS

| | | |
|---|---|---|
| DE | 102013218795 A1 | 3/2015 |
| DE | 102013017124 A1 | 4/2015 |
| JP | 2001108904 A | 4/2001 |
| JP | 2010152409 A | 7/2010 |
| JP | 2010532487 A | 10/2010 |
| JP | 2013065266 A | 4/2013 |
| WO | 2009146016 A1 | 12/2009 |

OTHER PUBLICATIONS

Cohen, Noy et al., "Enhancing the performance of the light field microscope using wavefront coding", Optics Express OSA 24817 vol. 22, No. 20, Oct. 2014, 1-23.

Huff, Joseph et al., "The Airyscan Detector from ZEISS Confocal Imaging with Improved Signal-to-Noise Ratio and Superresolution", Carl Zeiss Microscopy GmbH, Jul. 2015, 1-19.

Ng, Ren et al., "Light Field Photography with a Hand-held Plenoptic Camera", Stanford Tech Report CTSR Feb. 2005, 1-11.

Stelzer, Ernst H. , "The Intermediate Optical System of Laser-Scanning Confocal Microscopes", Handbook of Biological Confocal Microscopy, Third Edition, edited by James B. Pawley, Springer Science+Business Media, LLC, New York, 2006, 207-220.

Bouchard, Matthew B. et al., "Swept Confocally-Aligned Planar Excitation (SCAPE) Microsocopy for High-Speed Volumetric Imaging of Behaving Organisms", Nature Photonics, vol. 9 (www.nature.com/naturephotonics), Feb. 2015, pp. 113-119.

* cited by examiner

LIGHT FIELD IMAGING WITH SCANNING OPTICAL UNIT

RELATED APPLICATIONS

This application claims priority under 35 U.S.C. § 119 from the application DE 10 2015 121 403.2, as filed on 9 Dec. 2015.

TECHNICAL FIELD

Various embodiments relate to an optical device and to a corresponding method. In particular, various embodiments relate to techniques, on the basis of a three-dimensional light field represented by measurement data for a multiplicity of scanning positions of a scanning optical unit, for generating a spatially resolved imaging of an object that comprises at least two images from different object planes of the object. The different object planes can be at a distance that is greater than the depth of field defined by a stop of an imaging optical unit of the optical device.

BACKGROUND

By means of the light field imaging it is possible to generate a spatially resolved imaging of an object, wherein the spatially resolved imaging comprises at least two images from different object planes of the object. The at least two images can typically correspond to object planes that are at a comparatively large distance from one another. By means of the light field imaging it may be possible, in particular, to generate a spatially resolved imaging, i.e. an imaging with depth information. A spatially resolved imaging is also designated as three-dimensional (3D) imaging. In the case of the spatially resolved imaging, the different images correspond to object planes that are at a distance that is greater than the depth of field of an imaging optical unit.

Light field imaging techniques are known which are based on the use of an arrangement of microlenses (microlens array), see US 2014/0263963 A1, for example. Such techniques have certain disadvantages and limitations.

By way of example, measurement data are detected which, on account of the positionally fixed arrangement of the microlenses, correspond to a scanning of the light field with fixedly predefined distances. The light field discretization induced by the scanning typically has a comparatively low spatial resolution.

Furthermore, microlenses having comparatively low Fresnel numbers can bring about additional scattering effects. This applies in particular to such objects which are situated far away from an object plane of an imaging optical unit used. This means that the physical-optical reconstruction technique used for generating the imaging of the object must typically be implemented in a comparatively complicated fashion. This can increase a requirement for computational capacities kept available or reduce an accuracy in the reconstruction.

The microlenses used typically have a comparatively long focal length. Therefore, the light field that is collected by an arrangement of microlenses cannot have a constant resolution as a function of the depth; near an image plane, in particular, the resolution can be particularly low. The focal length of a microlens cannot be reduced in a simple manner, on account of the production of the microlens.

The light field imaging by means of an arrangement of microlenses typically necessitates a detector having a large number of pixels. Therefore, in the case of the conventional light field imaging, use is typically made of detectors having a CCD sensor (charge coupled device, CCD). However, CCD sensors may have a comparatively low sensitivity, as a result of which a light intensity must be chosen to be comparatively high. That can lead to disadvantages in the case of light-sensitive samples, for example biological cell cultures. Moreover, the image quality of the spatial imaging can be decrementally affected.

SUMMARY

Therefore, there is a need for improved techniques of light field imaging. In particular, there is a need for such techniques of light field imaging which eliminate at least some of the abovementioned disadvantages and limitations. In particular, there is a need for light field imaging techniques that are accurate and optically simple to implement.

In accordance with one aspect, various embodiments relate to an optical device for light field imaging. The optical device comprises a light source. The light source is configured to emit light along an optical path. The optical device also comprises a detector and a sample holder. The sample holder is arranged in the optical path downstream of the light source and upstream of the detector. The sample holder is configured to fix an object in the optical path of light. The optical device also comprises a scanning optical unit. The scanning optical unit is arranged in the optical path downstream of the sample holder and upstream of the detector. The scanning optical unit is configured, for a multiplicity of scanning positions, in each case selectively to direct light incident from different angular ranges from the object onto the detector. The detector is configured to detect measurement data for each of the multiplicity of scanning positions. The optical device also comprises a computing unit coupled to the detector. The computing unit is configured, on the basis of a three-dimensional light field represented by the measurement data of the multiplicity of scanning positions, to generate a spatially resolved imaging of the object. The spatially resolved imaging of the object comprises at least two images from different object planes of the object.

In accordance with a further aspect, various embodiments relate to a method. The method comprises driving a scanning optical unit, arranged in an optical path of an optical device downstream of a sample holder and upstream of a detector. Driving the scanning optical unit is effected in order, for a multiplicity of scanning positions, in each case selectively to direct light incident from different angular ranges from an object onto the detector. The method furthermore comprises, for each of the multiplicity of scanning positions: obtaining measurement data by the detector. The method furthermore comprises, on the basis of a 3D light field represented by the measurement data of the multiplicity of scanning positions: generating a spatially resolved imaging of the object. The spatially resolved imaging of the object comprises at least two images from different object planes of the object.

The features set out above and features described below can be used not only in the corresponding combinations explicitly set out, but also in further combinations or in isolation, without departing from the scope of protection.

BRIEF DESCRIPTION OF THE DRAWINGS

FIG. 7 schematically illustrates the beam path of light of the optical device in accordance with FIG. 4 in greater detail than FIG. 5, wherein FIG. 7 illustrates a design of the optical device as a laser scanning microscope.

DETAILED DESCRIPTION

The present invention is explained in greater detail below on the basis of preferred embodiments with reference to the drawings. In the figures, identical reference signs designate identical or similar elements. The figures are schematic representations of various embodiments of the invention. Elements illustrated in the figures are not necessarily illustrated in a manner true to scale. Rather, the different elements illustrated in the figures are reproduced in such a way that their function and general purpose become comprehensible to the person skilled in the art. Connections and couplings between functional units and elements as illustrated in the figures can also be implemented as an indirect connection or coupling. A connection or coupling can be implemented in a wired or wireless fashion. Functional units can be implemented as hardware, software or a combination of hardware and software.

Techniques for light field imaging are explained below. The light field imaging makes it possible to generate a spatially resolved imaging of an object. In this case, the spatially resolved imaging of the object means that at least two images from different object planes of the object are provided, wherein the object planes are at a comparatively large distance from one another. In examples, 10 or 100 or more images from different object planes can be provided. In particular, it is possible for specific object planes to be at a distance from one another that is greater than a depth of field brought about by an imaging optical unit. However, adjacent object planes can be at a distance from one another that is less than the depth of field brought about by the imaging optical unit.

In accordance with one aspect, various embodiments relate to an optical device for light field imaging. The optical device comprises a light source. The light source is configured to emit light along an optical path. The optical device also comprises a detector and a sample holder. The sample holder is arranged in the optical path downstream of the light source and upstream of the detector. The sample holder is configured to fix an object in the optical path of light. The optical device also comprises a scanning optical unit. The scanning optical unit is arranged in the optical path downstream of the sample holder and upstream of the detector. The scanning optical unit is configured, for a multiplicity of scanning positions, in each case selectively to direct light incident from different angular ranges from the object onto the detector. The detector is configured to detect measurement data for each of the multiplicity of scanning positions. The optical device also comprises a computing unit coupled to the detector. The computing unit is configured, on the basis of a three-dimensional light field represented by the measurement data of the multiplicity of scanning positions, to generate a spatially resolved imaging of the object. The spatially resolved imaging of the object comprises at least two images from different object planes of the object.

By way of example, the optical device can be a microscopy device. By way of example, the optical device can furthermore comprise an imaging optical unit configured to generate an intermediate image of the object in an image plane, said intermediate image having a magnification factor of >1. The optical device can be configured for fluorescence imaging, for example. Particularly light-sensitive samples can be imaged in such a case.

By way of example, the optical device can be implemented using transmission geometry or reflection geometry. By way of example, it would be possible for the optical device to be designed as a laser scanning microscope. By way of example, the light source can emit monochromatic light or polychromatic light.

In various exemplary implementations, different scanning optical units can be used. In various variants, the scanning optical unit can comprise for example one or two or more movable scanning mirrors. By way of example, the scanning positions can correspond to different angular settings of the movable scanning mirrors. For this purpose, the scanning mirrors can be tiltable. In further scenarios, the scanning optical unit could also comprise optical elements that are displaceable laterally—i.e. perpendicularly to the optical path.

Selectively directing light onto the detector can mean, for example, that light which is situated outside a field region associated with the specific scanning position is not directed onto the detector or does not reach the detector. For this purpose, it would be possible, for example, for the optical device to comprise a field stop arranged in an image plane of the scanning optical unit. The field stop can have an aperture which delimits a beam diameter of the light. By means of such techniques, it may thus be possible to scan a specific region of the light field (field region) for each of the scanning positions. The field region should thus be understood to mean e.g. the spatial region which is delimited by the aperture of the field stop and to which light from a corresponding angular range is in each case selectively directed onto the detector. An angular range (angular resolution) associated with a scanning position here can have e.g. a size of less than 10°, or preferably of less than 1°, particularly preferably of less than 0.1°. A larger angular resolution can bring about a larger resolution with which the light field is scanned.

In order to generate the spatially resolved imaging on the basis of the 3D light field represented by the measurement data of the multiplicity of scanning positions, various techniques known from the literature, in principle, can be used. By way of example, US 2014/0263963 A1 discloses generating the spatially resolved imaging of the object on the basis of measurement data that were detected by means of the microlens arrangement. Such techniques can also be used for generating the imaging in the present case and the corresponding disclosure is incorporated herein by reference.

By way of example, the scanning positions can be situated close to one another or a comparatively small field stop can be used. The angular resolution can be large in this way. As a result, it is possible to detect measurement data for many field regions situated close to one another. By using the scanning optical unit it is possible—for example depending on the number of scanning positions used—to achieve a particularly high lateral spatial resolution when scanning the light field. In particular, it is possible for a distance between adjacent microlenses used in the customary implementations of a corresponding optical device for recording a light field to be non-limiting for the spatial resolution when scanning the light field. By achieving a high spatial resolution when scanning the light field, it is possible in turn to generate a particularly accurate and high-resolution 3D imaging of the object.

It is also possible to achieve a particularly high resolution along the optical axis (depth resolution). In particular, it is possible for an imaging of the object to be generated which comprises a large number of images from the adjacent object planes of the object; at the same time, the extremal object planes of the object that are represented by images of the imaging can be at a large distance from one another.

Furthermore, it may be possible to adapt the number of scanning positions used as necessary. By way of example, the adaptation can take place depending on the time period (measurement duration) required for detecting all the measurement data. In this way, by way of example, in applications in which a particularly fast generation of the imaging of the object is desired, the measurement duration can be reduced by means of a smaller number of scanning positions; however, this may cause the spatial resolution when scanning the light field to be comparatively low. A short measurement duration may be worthwhile particularly in the case of light-sensitive objects or for creating coarse overview images.

By way of example, the optical device could comprise an imaging optical unit arranged in the optical path, e.g. downstream of the sample holder and upstream of the scanning optical unit. The imaging optical unit can be implemented as an objective. In various examples, it is possible for the imaging optical unit to have a variable focal length, i.e. to be implemented as a zoom optical unit. As a result, it may be possible to generate imagings of objects of different sizes. Moreover, for example in a case in which the optical device is designed as a microscopy device, a different magnification factor can be implemented.

The imaging optical unit can bring about an imaging of the object with a specific depth of field. The depth of field can be given by an object-side stop aperture of the imaging optical unit. By way of example, the depth of field can be determined by a wavelength of the light emitted by the light source along the optical path. By way of example, the depth of field could be proportional to the wavelength of the emitted light and inversely proportional to the square of the object-side stop aperture of the imaging optical unit.

In the context of the light field imaging, it is then possible for the at least two images of the spatial imaging of the object to be at a distance from one another that is greater than the depth of field.

By means of light field imaging techniques, it may thus be possible to include a particularly large amount of information about the imaged object in the imaging. In particular, it may be possible, by taking account of the at least two images which comprise information from different object planes of the object, subsequently to alter a point of sharpness of a graphical reproduction of the imaging. Furthermore, it may be possible to determine a depth profile of the object—i.e. parallel to the optical path—on the basis of the imaging.

It would be possible, for example, for the detector to comprise a photomultiplier. By way of example, the photomultiplier could comprise a multiplicity of pixels, e.g. fewer than 20 pixels. By way of example, the photomultiplier could comprise fewer than 50 or fewer than 250 pixels. Typically, the photomultiplier can comprise per pixel, for example, a photocathode with a secondary electron multiplier connected downstream. By way of example, the pixels of the photomultiplier can be comparatively large, for example compared with pixels of a CCD sensor. By way of example, the pixels could have dimensions having a side length of more than 100 μm or greater.

It may typically be possible for the photomultiplier to have a particularly great sensitivity. On account of the comparatively small number of pixels of the photomultiplier, it may be possible to use particularly sensitive detectors. As a result, it may be possible to use light sources having a comparatively low intensity. As a result, particularly in applications requiring a low light loading—such as fluorescence imaging, for example—a noise-free imaging of the object can be generated despite the low intensity of the light source. Overall, it may be possible to choose an exposure time per scanning position to be comparatively short and thereby to reduce the measurement duration.

In various examples, it may be possible for the detector to comprise, for each pixel of the, an optical waveguide a first end facing the sample holder and a second end facing the respective pixel. The optical waveguides can have for example in each case a diameter of less than one Airy unit, preferably of less than 0.5 Airy unit, particularly preferably of less than 0.2 Airy unit.

In various scenarios, the photomultiplier can comprise a pixel array. However, it would also be possible for the pixels to be formed sporadically in places, that is to say not to form a pixel array. Typically, photomultipliers can be comparatively large and the individual pixels can be spaced particularly far apart. Therefore, by means of the optical waveguides it may be possible to guide light onto the pixels; in particular, it is possible for the optical waveguides to be more closely packed than the pixels. Microlenses can be situated in front of the optical waveguides in order to gather as much light as possible. Conventional pixels of multichannel detectors such as CCD sensors that are used for the light field imaging typically have a diameter with a magnitude of less than 10 μm. By way of example, it would be possible for the optical waveguides to have a diameter of e.g. more than 20 μm or more than 100 μm or more than 250 μm.

Each pixel of the detector can thus be assigned a respective microlens that focuses the light from the corresponding angular range on a detector. By way of example, the respective microlens could be arranged in front of the first end of a corresponding optical waveguide.

By using a corresponding detector geometry or, in particular, the microlenses assigned to the pixels, what can be achieved is that particularly densely packed effective pixels can be implemented. A particularly high collection efficiency of preferably above 80%, particularly preferably above 90%, can be achieved as a result. By means of the high collection efficiency, it is possible to achieve a high signal-to-noise ratio and thus a high resolution in a lateral direction when scanning the light field. A particularly high depth resolution can be achieved as a result.

It would be possible, for example, for the optical device furthermore to comprise a collimator optical unit. In this case, the collimator optical unit can be arranged in the optical path downstream of the at least one scanning mirror of the scanning optical unit and upstream of the detector. By providing the collimator optical unit, it is possible to achieve an imaging of the pupil plane of the imaging system onto a detector area of the detector.

It would be possible, for example, for a distance between the collimator optical unit and the detector to correspond to a focal length of the collimator optical unit. The detector can thus be arranged in the back focal plane of the collimator optical unit. In particular, what can be achieved by means of the collimator optical unit is that the detector area of the detector is illuminated substantially completely for each of the multiplicity of scanning positions. As a result, it may be possible to scan the light field comprehensively by means of the detector signals of the different pixels of the detector for each of the multiplicity of scanning positions.

By way of example, the collimator optical unit could be of aplanatic design. By providing the aplanatic collimator optical unit, it is possible to fulfil an advantageous imaging condition. In particular, the Abbe sine condition can be fulfilled, which in turn enables a particularly simple generation of the imaging of the object by means of light field imaging techniques.

It can be desirable to configure the optical device in such a way that it can be operated with different hardware configurations. In this way, for example, in a first operating mode it is possible to achieve a light field imaging (light field operating mode), and in a second operating mode it is possible to achieve a different imaging, for example a laser scanning imaging (laser scanning operating mode). The laser scanning imaging can be designed for example with a confocal pinhole stop for implementing a large depth resolution.

In this regard, it would be possible, for example, for the optical device to comprise a movable stage, on which different optical elements are arranged, such as the optical elements described above, for example. It might then be possible, depending on the operating mode, to move different optical elements into the optical path or out of the optical path by adjusting the movable stage. For this purpose, the stage can be movable between a first position and a second position and optionally further positions.

By way of example, it would be possible for the collimator optical unit to be coupled to the movable stage. It would then be possible for the collimator optical unit to be positioned in the optical path in the first position of the movable stage and not to be positioned in the optical path in the second position of the movable stage. In this way, it might be possible for the light field operating mode to be implemented in particular in the first position. In the second position of the movable stage, other imaging techniques for generating the imaging of the object could be carried out; by way of example, the laser scanning operating mode could be carried out.

By way of example, it would be possible for the collimator optical unit to be designed as a zoom optical unit. It shall then be possible, for example, for the zoom optical unit to be configured to image a pupil plane, in particular an exit pupil of the scanning optical unit with variable focal length onto the detector. The zoom optical unit can be designed in particular as an optical unit with a variable focal length, wherein the axial distances of object field—the field stop—and image field remain unchanged. Such zoom optical units are embodied as at least two-stage zooms, for example, wherein the focal length is varied with one zoom stage and the distance between object plane and pupil plane is kept constant with a further zoom stage.

If the collimator optical unit is designed as a zoom optical unit, what can be achieved is that even for imaging optical units of the optical device which have a variable focal length, the arrangement of pixels of the detector is illuminated as comprehensively as possible for the different focal lengths of the imaging optical unit.

By way of example, the field stop could also be coupled to the movable stage. The field stop could be positioned in the optical path in the first position of the movable stage and not be positioned in the optical path in the second position of the movable stage.

The aperture of the field stop can define in particular the field region that is directed onto the detector for each of the multiplicity of scanning positions. In this case, smaller (larger) apertures can correspond to smaller (larger) field regions and thus to a larger (smaller) spatial resolution of the spatial imaging or a shorter (longer) measurement duration.

By way of example, it would be possible for the aperture of the field stop and/or the multiplicity of the scanning positions to be configured in such a way that at least two scanning positions have overlapping field regions. This can mean, therefore, that for the at least two scanning positions light from the overlapping field region is directed onto the detector. This means that the light fields underlying the respective measurement data can overlap. A particularly comprehensive scanning of the light field can be effected by means of such techniques. A particularly accurate imaging of the object can be generated as a result.

In further examples, it would be possible for the aperture of the field stop and/or the multiplicity of the scanning positions to be configured in such a way that the multiplicity of the scanning positions have no overlapping or spaced-apart field regions. The light field can be scanned particularly rapidly as a result. The measurement duration can be reduced. At the same time, an accuracy with which the imaging of the object is generated can be reduced. An exposure of the object to light can be reduced.

In various examples, it is possible for the aperture of the field stop to have a variable diameter in at least one direction. By way of example, it may be possible to set different diameters of the aperture of the field stop in different operating modes. By way of example, for the light field imaging different operating modes can be associated with different spatial resolutions. By way of example, the variable diameter of the aperture can make it possible for the field stop to implement a confocal pinhole stop having a particularly small diameter for the laser scanning operating mode. Larger diameters of the aperture of the field stop can be used for the light field operating mode.

By way of example, the field stop—at least in the light field operating mode—can have an aperture having a diameter that is in the range of 2-20 Airy units, preferably in the range of 3-8 Airy units, particularly preferably between 4 and 5 Airy units. This can mean, therefore, that the field stop has an aperture having a diameter that is greater than the diameter of an aperture of a typical pinhole stop used for example in connection with conventional laser scanning microscopes.

In accordance with a further aspect, various embodiments relate to a method. The method comprises driving a scanning optical unit, arranged in an optical path of an optical device downstream of a sample holder and upstream of a detector. Driving the scanning optical unit is effected in order, for a multiplicity of scanning positions, in each case selectively to direct light incident from different angular ranges from an object onto the detector. The method furthermore comprises, for each of the multiplicity of scanning positions: obtaining measurement data by the detector. The method furthermore comprises, on the basis of a 3D light field represented by the measurement data of the multiplicity of scanning positions: generating a spatially resolved imaging of the object. The spatially resolved imaging of the object comprises at least two images from different object planes of the object.

By way of example, the method can furthermore comprise determining the scanning positions on the basis of a predefined spatial resolution of the spatially resolved imaging of the object.

By way of example, the method can furthermore comprise driving a field stop having a diameter that is variable in at least one direction. The driving can be effected for the purpose of setting the diameter. The method can furthermore comprise determining the diameter of the field stop on the basis of a predefined depth resolution of the spatially resolved imaging of the object.

By way of example, the method according to the aspect currently being discussed can be performed by an optical device according to a further aspect.

Therefore, for a method according to the aspect currently being discussed, it is possible to achieve effects comparable with the effects that can be achieved for the optical device according to the further aspect.

Figure 1:
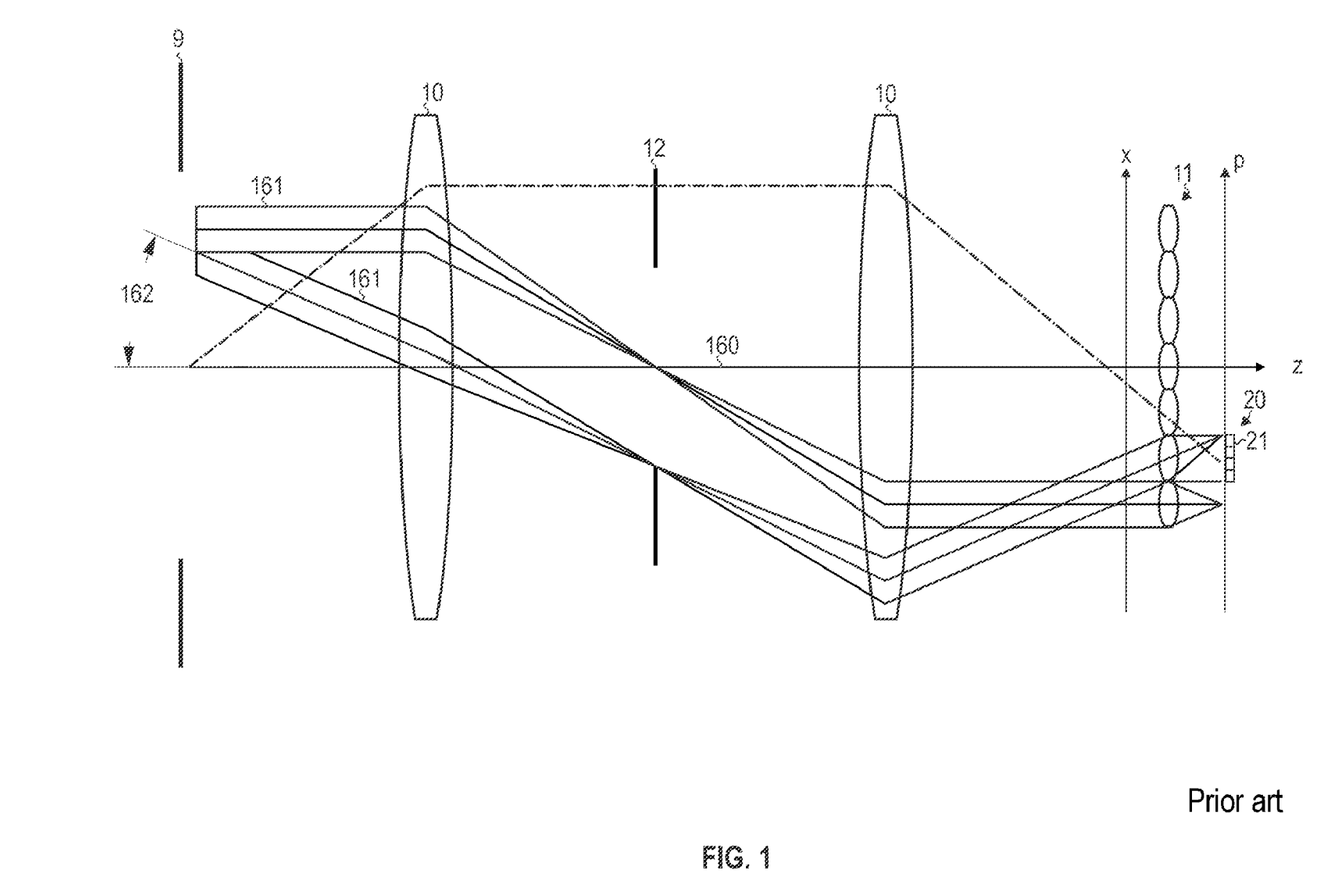
FIG. 1 illustrates the beam path of light through an optical device in accordance with reference implementations, wherein the optical device is configured for light field imaging and comprises a microlens array.

FIG. 1 illustrates the beam path of light 161 through an optical device configured for the light field imaging in accordance with reference implementations. The light enters through an object-side field stop 9 and is imaged along the optical axis 160 (parallel to the axis z in FIG. 1) through lenses 10 onto an arrangement of microlenses (microlens array) 11. Each microlens of the microlens array 11 is in turn assigned to a plurality of pixels 21 of a detector 20 (only the pixels 21 for a single microlens are shown in FIG. 1, for reasons of clarity). The quantity of pixels which are assigned to a microlens of the microlens array 11 is typically designated as a channel.

FIG. 1 illustrates, in particular, the beam paths 161 for light which is incident from an object (not shown in FIG. 1) at two specific angles 162, for which reason the beam paths 161 pass through the field stop 9 in parallel fashion.

An implementation of the optical device in accordance with FIG. 1 has the disadvantage, for example, that the effective stop of the optical device is limited by the stop 12. The aperture of the stop 12 is delimited by the focal length of the microlenses of the microlens array 11. In the case of a larger field stop 12, rays passing through a microlens would strike for example an adjacent channel of the detector (dashed-dotted line in FIG. 1) and thus corrupt the imaging. The size of the field stop 9 is delimited by the size of the microlens array 11.

It is evident from FIG. 1 that different angles are imaged by the microlens array 11 onto different pupil coordinates p that correspond to the pixels 21. The intensity is then obtained by means of integration over the light field L of all the pupil coordinates $$I(x,y)=\iint L(x,y;p,q)dpdq, \qquad (1)$$

wherein p,q are the exit pupil coordinates (corresponding to the pixels 21) and x,y are the image plane coordinates. Image plane coordinates x,y correspond to the grid of the microlens array 11. Therefore, the image I(x,y) has a comparatively low spatial resolution corresponding to the microlens array 11. Since the microlens array 11 is predefined, the spatial resolution cannot be increased in a simple manner.

In this case, different image plane coordinates p,q define different angles or angular ranges at which light from the object is incident (cf. FIG. 1). By using the microlens array 11 in combination with assigned detector pixels 21, it is thus possible simultaneously to collect light from a large angular range.

The image I(x,y) can be obtained for a plurality of object planes of an object extended in the z-direction, that is to say not just for the object plane at the focus of the imaging optical unit, as shown in FIG. 1. In particular, it is possible to obtain the image for object planes which, in the z-direction, are at a distance from a focal plane of an imaging optical unit that is greater than a depth of field of the system for each individual image I(x,y).

Figure 2:
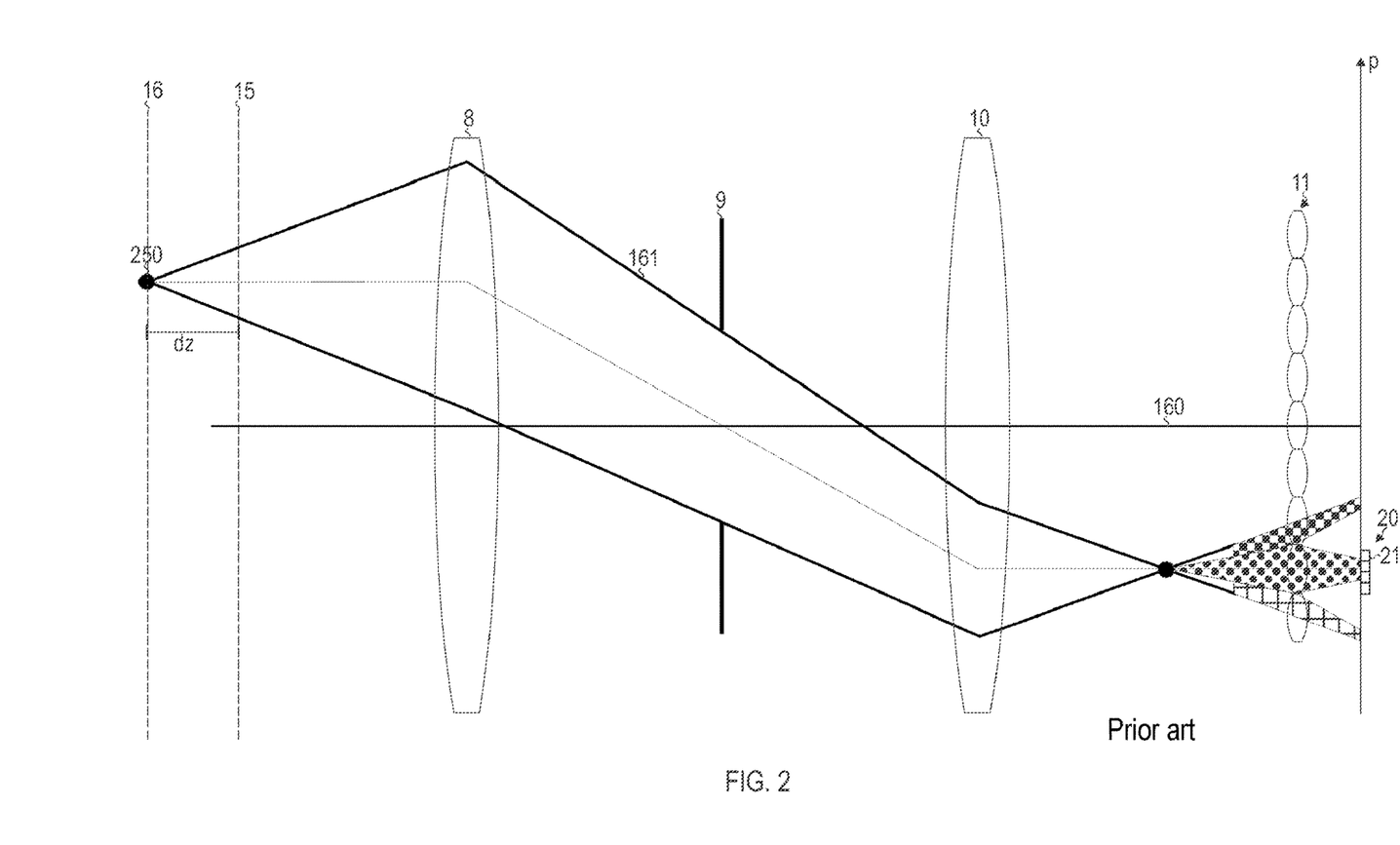
FIG. 2 illustrates the beam path of light through the optical device in accordance with FIG. 1, an object plane being offset relative to the image plane.

FIG. 2 illustrates aspects concerning the generation of an image for an object plane 16 spaced apart relative to the focal plane 15 by dz. It is evident from FIG. 2 that the pupil coordinates p for the object 250 defocused by dz varies characteristically for the different channels by virtue of the microlens array 11. A corresponding expression for the light field from the defocused image plane x',y' 16 into the focal plane 15 results under specific approximations:

$$L(x',y',;p,q)=L(x+dzp/m,y+dzq/m;p,q)\approx L(x+dzp,y+dzq; p,q), \qquad (2)$$

where $m=\sqrt{n^2-p^2-q^2}$, wherein n is the refractive index.

One specific approximation that influences Equation 2 mentioned above may be given in particular by $$\tan \alpha = \sin \alpha = \alpha \qquad (3)$$

wherein α describes the angle 162 of incidence of the light. The condition in accordance with Equation 3 holds true for small angles, in particular.

Figure 3:
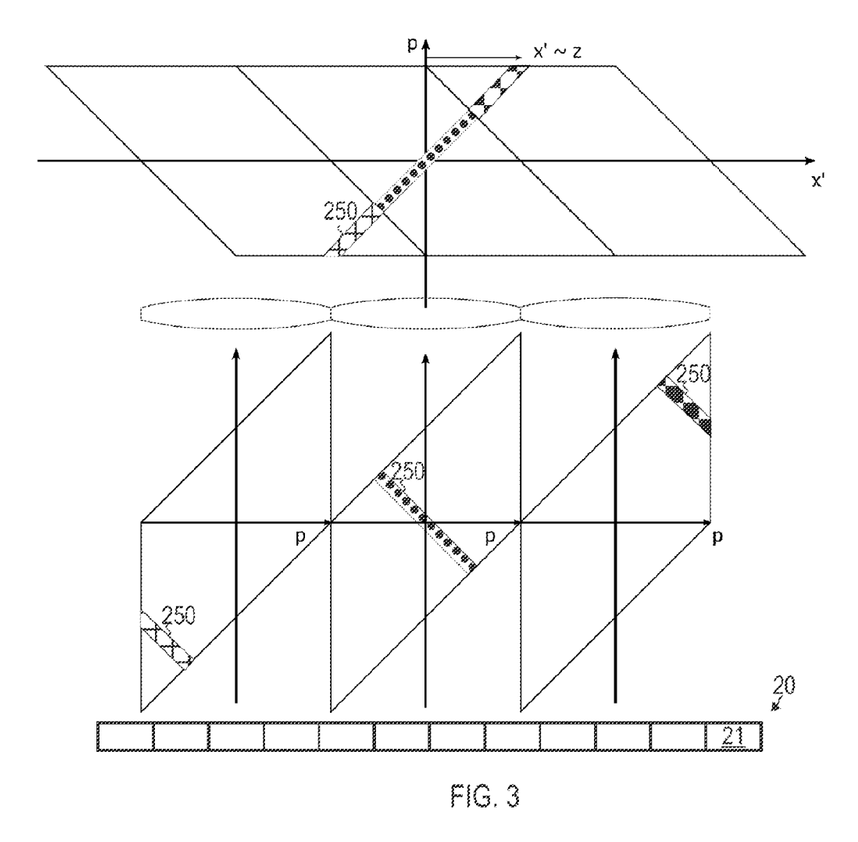
FIG. 3 schematically illustrates effects that can occur as a result of the microlens array of an optical device in accordance with reference implementations.

This effect can be utilized to generate the image I(x,y) for, and is also illustrated with reference to FIG. 3. The image plane x' is illustrated in FIG. 3, at the top. The microlens plane is illustrated in FIG. 3, in the centre. The microlens array 11 distributes the light field in the channels and forms local spectra, which corresponds to a rotation of the light field by 90°. This rotation corresponds to a Fourier transformation of the image plane x (illustrated above the microlens array 11 in FIG. 3) into the microlens plane (an excerpt from the microlens array 11 is illustrated in FIG. 3). The propagation of the light from the image plane x' to the lens array or from the microlens array to the detector 20 brings about a shearing of the phase space volumes. Therefore, the phase space volumes assigned to the microlenses in the image plane x' and in the detector plane 20 are trapezium-shaped. The trapezium-shaped areas are thus the phase space volumes respectively assigned to a microlens or to a channel. The gradient of the light field corresponding to the object 250 in this illustration corresponds to the offset of the object plane 16 relative to the focal plane 15, cf. Equation 2.

The spectrum recorded by a microlens is dependent on the position of the object 250. On account of the trapezium-shaped configuration of the phase volumes that are associated with a microlens, there is an overlap in the projected phase space volumes between adjacent channels. In particular, rays situated outside the phase space volume associated with a microlens are collected by adjacent microlenses.

Since the Fourier transformation is formed in each channel, the light is projected in the x-direction, which corresponds to an integration over the light field collected by said microlens. Afterwards, the light field is collected by the pixels 21 of the detector 20. An inverse transformation into the image plane is possible by means of post-processing. This can take account of the fact that each pixel 21 of the detector 20 collects a specific portion of the light field in the phase space diagram.

To summarize, therefore, the microlens array 11 has the effect that different angles 162 at which the light is incident are imaged onto different pupil coordinates in the channels, and that differently defocused image planes 16 are imaged in each case onto different channel-specific pupil coordinates.

The various limitations and disadvantages brought about by a light field imaging on the basis of the microlens array 11 can be overcome and reduced by optical devices 101 in accordance with various embodiments.

Figure 4:
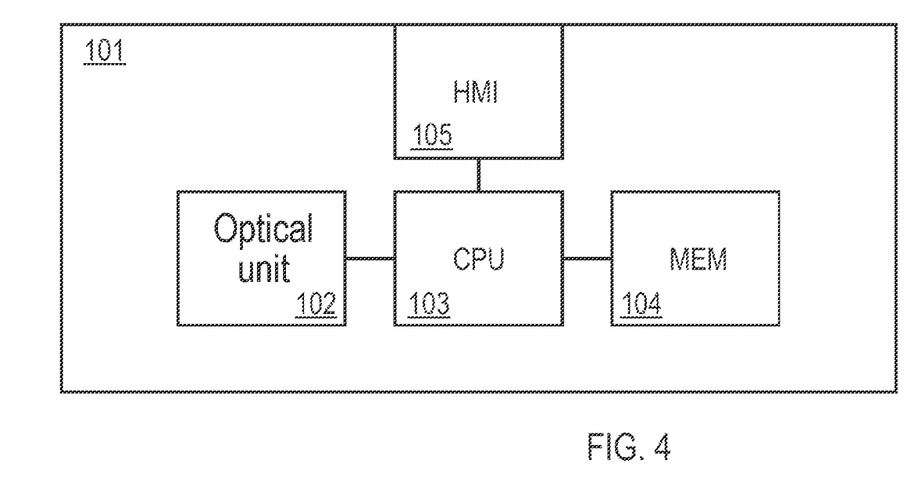
FIG. 4 schematically illustrates an optical device in accordance with various embodiments.

FIG. 4 illustrates an optical device 101 in accordance with various embodiments. The optical device 101 comprises an optical unit 102. The optical unit 102 can comprise for example elements selected from the following group: a light source; an imaging optical unit; a detector; a sample holder; a movable stage, and a scanning optical unit. The optical unit 102 is coupled to a processor or a computing unit 103.

The computing unit 103 can be configured to control the optical unit 102. By way of example, a scanning optical unit of the optical unit 102 could be controlled by the computing unit 103; in this way, by way of example, an angle of a scanning mirror of the scanning optical unit could be set. By way of example, a stage of the scanning optical unit could be adjusted between different positions by the computing unit 103 in order in this way to implement e.g. different operating modes.

The computing unit 103 can also be configured to reconstruct a spatial imaging of the object by means of light field imaging techniques from the measurement data detected for the different scanning positions.

The optical device 101 furthermore comprises a memory 104, for example a non-volatile memory. The memory 104 can store for example operating instructions that can be executed by the computing unit 103. Executing the operating instructions by means of the computing unit 103 can have the effect that the computing unit 103 performs techniques with regard to generating a spatially resolved imaging of the object 250 by means of light field imaging and/or controls the optical unit 102.

The optical device 101 furthermore comprises a user interface 105. The user interface 105 is configured to output commands to a user and to receive commands from a user. By way of example, it would be possible for the user interface 105 to comprise a screen on which the generated, spatially resolved imaging of the object is reproduced.

Figure 5:
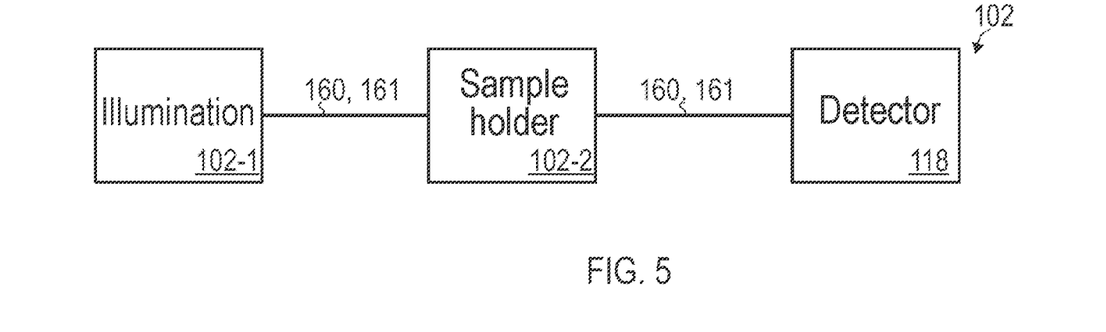
FIG. 5 schematically illustrates the beam path of light of the optical device in accordance with FIG. 4.

Aspects relating to the optical unit 102 are illustrated in greater detail with reference to FIG. 5. FIG. 5 illustrates that a light source 102-1 emits light along an optical path 160, 161 or the optical axis. A sample holder 102-2 is arranged in the optical path 160, 161 downstream of the light source 102-1 and upstream of a detector 118. The sample holder 102-2 is configured to fix an object 250 in the optical path 160, 161.

In accordance with various examples, a wide variety of types and kinds of detectors 118 can be used. In one example, the detector 118 is implemented by a photomultiplier. The photomultiplier can have a particularly high sensitivity in relation to incident light. At the same time, the detector 118 can have a comparatively small number of pixels, for example in particular in comparison with detectors 20 used in accordance with reference implementations that comprise a microlens array 11. By way of example, the photomultiplier could comprise a multiplicity of pixels, e.g. fewer than 20 pixels, preferably fewer than 50 pixels, particularly preferably fewer than 250 pixels. By way of example, the photomultiplier could comprise a pixel array comprising at least 20 or more than 50 or more than 250 pixels. The individual pixels of the photomultiplier can have a comparatively large sensitive area, for example in comparison with the pixels 21 of a detector 20 in accordance with reference implementations that comprise a microlens array.

One example of an architecture of the detector 118 comprises optical waveguides disposed upstream of the photomultiplier. Said optical waveguides can have a very large diameter in comparison with the camera pixels used in the light field measurement from the prior art.

Figure 6:
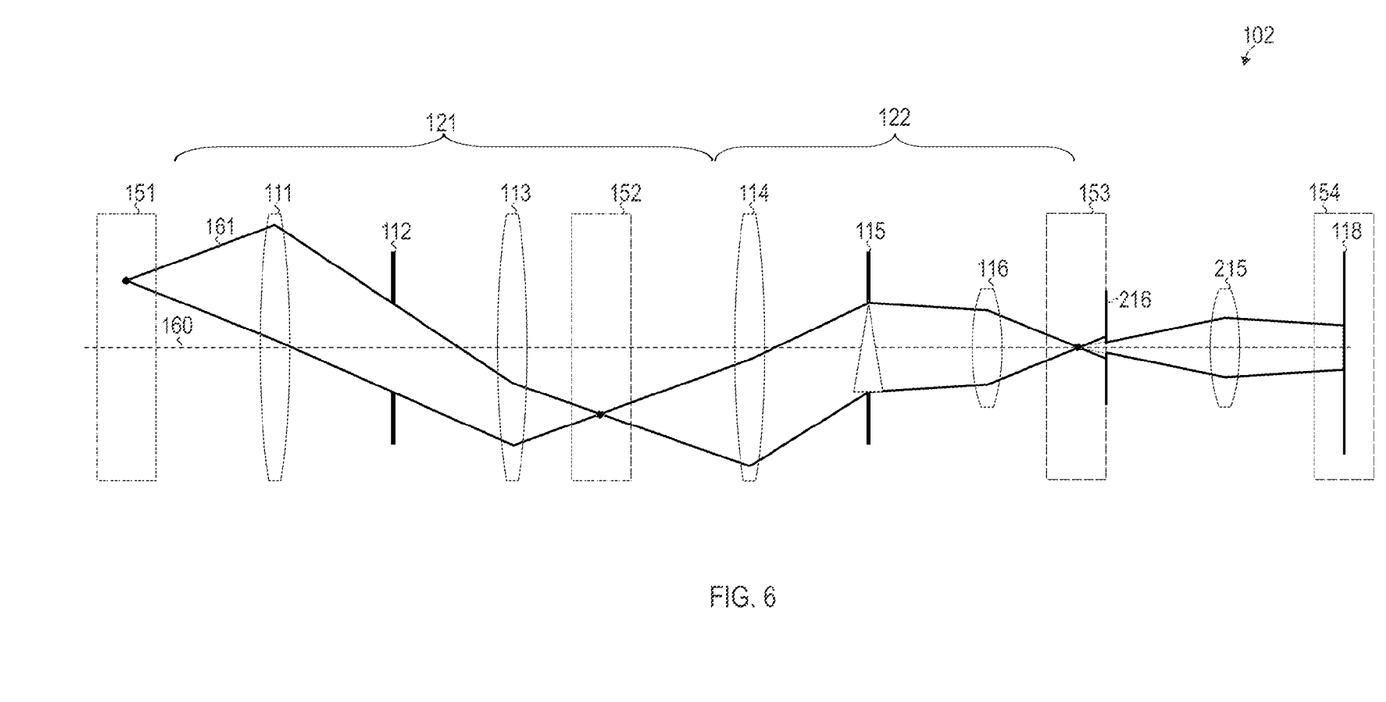
FIG. 6 schematically illustrates the beam path of light of the optical device in accordance with FIG. 4 in greater detail than FIG. 5.
Figure 7:
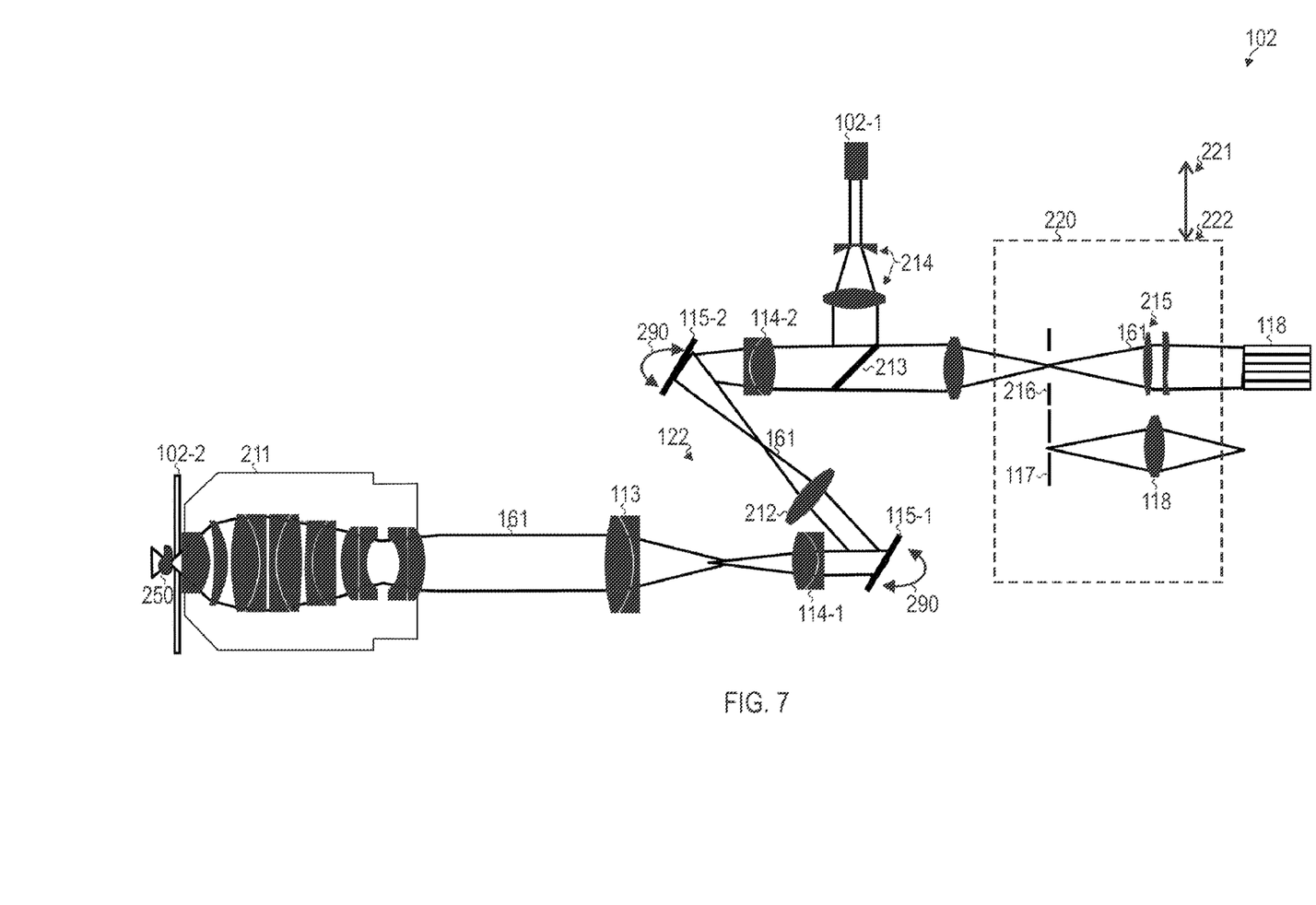

FIG. 6 and FIG. 7 illustrate details of the optical unit 102. Firstly referring to FIG. 6: the optical unit 102 is configured to enable the comparatively large pixels of the detector 118. For this purpose, the optical unit 102 comprises a scanning optical unit 122. It is evident from a comparison of FIGS. 2 and 6, for example, that the scanning optical unit 122 replaces the microlens array 11. In the example in FIG. 6, the scanning optical unit 122 comprises two lenses 114, 116 and a scanning mirror 115, which is illustrated schematically in transmission with a specific deflection angle. The scanning mirror 115 is preferably situated in a pupil plane of the overall system.

The optical unit 102 also comprises an imaging optical unit 121. The imaging optical unit 121 images the object 250, arranged in an object plane 151, into an image plane 152. For this purpose, the imaging optical unit 121 comprises two lenses 111, 113 and a stop 112. In various examples, the imaging optical unit 121 could be configured to generate a magnified image of the object 250 in the image plane 152. In such a case, it is possible for the optical device to be operated as a microscopy device.

The scanning optical unit 122 is then configured, for a multiplicity of scanning positions, in each case selectively to direct light incident from different angular ranges 162 from the object 250 onto the detector 118. For this purpose, the lenses 114, 116 image the detector-side image plane 152 of the imaging optical unit 121 onto the detector-side image plane 153 of the scanning optical unit 122. The image plane 153 corresponds to an exit pupil of the scanning optical unit 122 or to a segment of the image of the object plane 151. The scanning mirror 115 is adjustable and can be tilted for the different angular positions by the computing unit 103, for example. For filtering fields regions not associated with a specific scanning position, a field stop 216 can be provided, which is arranged in the image plane 153 of the scanning optical unit 122. By means of a suitable choice of the aperture of the field stop 216, it is possible to define an extent of the field region which can reach the detector 118 for each of the scanning positions. As illustrated in FIG. 6, object points which are not situated in the ideal object plane are imaged in a manner spaced apart axially with respect to the field stop 216. Starting from a specific distance, therefore, specific angular ranges of the radiation assigned to the object point are also shaded by the field stop.

In various implementations, the optical unit 102 of the optical device 101 also comprises a collimator optical unit 215. The collimator optical unit 215 has the effect that the light that has passed through the field stop 216 is directed onto the detector 118 arranged in a detector plane 154, such that light concerning different angular ranges is collected on the individual pixels of the detector. This means that the collimator optical unit 215 is configured to focus in each case an angular range of the light which passes through the field stop 216 onto a pixel 21 of the detector 118. In this case, the collimator optical unit 215 can be configured to illuminate substantially the entire sensitive area of the detector 118. For this purpose, a distance between the collimator optical unit 215 and the detector 118 can correspond to a focal length of the collimator optical unit or the detector 118 can be arranged in the back focal plane of the collimator optical unit 215.

In various implementations, it may be possible for the imaging optical unit 121 to be designed as a zoom optical unit. This can mean, therefore, that a focal length of the imaging optical unit 121 is designed to be variable. In such a case, it can be worthwhile for the collimator optical unit 215 also to be designed as a zoom optical unit and to have a variable focal length. This is because it can then be ensured that a suitable illumination of the sensitive area of the detector 118 is effected in each case for the different zoom settings of the imaging optical unit 121.

For example by varying the Z-position of the object relative to the imaging optical unit 121 or varying the focal plane of the imaging optical unit 121, it may be possible to detect the light field in freely selectable regions or curves through the object 250. By way of example, the light field could be detected at one or more separate or connected points within the object 250. The light field could be detected selectively for specific object planes or for specific regions offset laterally with respect to the optical axis 160. By means of a combination of adjusting the focal plane and the scanning positions, it is also possible to implement tilted trajectories through the object 250. As a result, a detection of the measurement data can be restricted to specific settable measurement regions (region of interest). As a result, the measurement duration can be reduced.

The implementation in FIG. 6 makes it possible to produce a scenario that is comparable or similar to the scenario in FIGS. 1-3; therefore, it is possible to use known reconstruction techniques for generating the spatial imaging in the context of light field imaging. This means that the reconstruction of the spatial imaging can have recourse to conventional techniques. In this case, the collimator optical unit 215 implements an individual microlens of the microlens array 11, in which case, however, light from the entire field stop 216 can be collected on account of the large extent and, in particular, larger and more efficient detectors 118 can be used on account of the collimator optical unit 215 that can be designed to be larger (that is to say with a greater focal length). A splitting of the phase front in accordance with FIG. 3 does not take place. A separation of different angle range with which light from the object is incident is implemented by means of the different scanning positions in the scenario in FIG. 6; this means that, in contrast to reference implementations based on a microlens array 11, a scanning of the object is effected for different image coordinates x,y by means of the multiplicity of scanning positions, cf. Equation 1. In order to enable a reconstruction by means of Equations 2, 3, it is advantageous if the collimator optical unit 215 is of aplanatic design. This is advantageous in particular since conventional microlenses in the prior art do not ensure an aplanatic imaging of the light field.

In some implementations it may be worthwhile for the aperture of the field stop 126 and the scanning positions to be coordinated with one another in such a way that at least two scanning positions have overlapping field regions. For this purpose, the aperture of the field stop can be coordinated e.g. with the angular ranges 162 of the different scanning positions. In this way, the spatial imaging of the object 250 can be generated particularly accurately. In particular, it may be possible, by comparing the measurement data corresponding to the scanning positions having overlapping field regions, to reduce an offset or inaccuracies in the assignment of the measurement data.

In other examples, it may also be possible for the aperture of the field stop 126 and the scanning positions to be coordinated with one another in such a way that the scanning positions have no overlapping field regions. In such a scenario, the measurement duration can turn out to be particularly short and it may be possible to generate the spatial imaging of the object 250 comparatively rapidly.

Furthermore, it is possible for a different extent of the individual angular ranges 162 to be chosen for different operating modes of the acquisition of the measurement data. In this case, larger (smaller) angular ranges 162 can typically correspond to a smaller (larger) spatial resolution of the generated spatial imaging of the object 250. In particular, an extent of the different angular ranges 162 can correspond to a pixel size of the spatial imaging of the object 250. The angular ranges can be varied for example by means of a variable focal length of the collimator optical unit 215.

Furthermore, it would be possible for the aperture of the field stop 216 to have a variable diameter in at least one direction. In this way—depending on the operating mode—a different extent of the different field regions could be implemented. By way of example, the field stop 216 could have a diameter in the range of 2-20 Airy units, preferably in the range of 3-8 Airy units, particularly preferably in the range of between 4 and 5 Airy units.

FIG. 7 shows an integration of the optical unit 102, such as was discussed above with reference to FIG. 6, into an optical device designed as a laser scanning microscope. In this case, the optical unit 102 comprises a light source 102-1, which emits coherent monochromatic light. A beam expander 214 and a beam splitter 213 direct the beam path 161. In the example in FIG. 7, the scanning optical unit comprises lenses 113, 114-1, 114-2, 212, and also two movable mirrors 115-1, 115-2, which can be tilted for the different scanning positions 290. The lenses 113, 114-1 form a so-called tube lens and a scanning eyepiece. Such a scanning optical unit can be used in the various examples described herein.

An objective 211 implements the imaging optical unit and is arranged in the vicinity of the object 250. The objective 211 comprises a set of lenses. The sample 250 is arranged in the focal plane of the objective 211 and is fixed by the sample holder 102-2. The objective 211 provides a magnified imaging of the object 250.

Light is emitted from the object 250 in the direction of the detector 118. Said light in turn passes through the scanning optical unit 113, 114, 115-1, 115-2, passes through the beam splitter 213 and is imaged by a lens 116 into an image plane in which the field stop 216 is situated. Such operation of the optical unit 102 can correspond to a light field operating mode.

Figure 8:
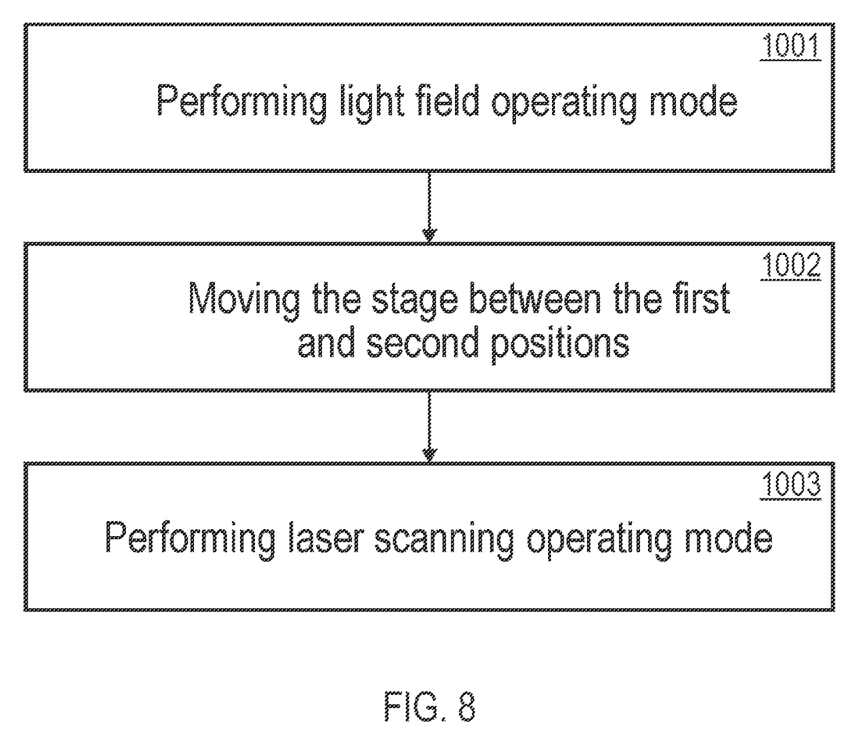
FIG. 8 is a flow diagram of a method in accordance with various exemplary embodiments.

Besides the light field operating mode 1001, the optical unit 102 can also be operated in a laser scanning operating mode 1003, cf. FIG. 8. Referring to FIG. 7 again, in the laser scanning operating mode 1003 of the optical unit 102, it may be worthwhile for a pinhole stop 117 (sometimes also referred to as a confocal pinhole) having a comparatively small aperture to be used instead of the field stop 116 having a comparatively large aperture. This may allow a particularly sharp separation between points which are arranged in different object planes of the object 250 to be achieved in the laser scanning operating mode 1003.

In order to enable such a change between different operating modes, the optical unit 102 comprises a movable stage 220, which is movable between a first position 221 and a second position 222, 1002 (cf. FIGS. 7 and 8). By way of example, the computing unit 103 can drive the movable stage in order to displace the latter between the first and second positions 221, 222. The collimator optical unit 215 and the field stop 216 are coupled to the movable stage 220 in such a way that the collimator optical unit 215 and the field stop 216 are positioned in the optical path 161 in the first position 221 of the movable stage 220. The pinhole stop 117 and a converging lens 118 are also coupled to the movable stage 220, but in such a way that they are situated in the optical path 161 in the second position 222. In this way, it is possible to switch back and forth between the laser scanning operating mode 1003 and the light field operating mode 1001 by means of adjustment between the first and second positions 221, 222. In various implementation, the laser scanning operating mode can also provide a super-resolution, e.g. by means of Airy scanning techniques.

The implementation in accordance with FIG. 7 allows a very large imaging scale. The imaging scale between the object plane with the object 250 and the detector 118 can be more than 1000, in particular 1500, in the laser scanning operating mode. Consequently, a point image can be formed in a highly magnified manner into the intermediate image plane with the field stop 216 or on the detector 118, such that point image radii of more than 100 μm, preferably more than 250 μm, become possible. Efficient detectors such as photomultipliers, for example, become possible as a result. By means of flexible optical waveguides disposed upstream of the individual photomultipliers (FIG. 7 only schematically illustrates the closely packed end of the optical waveguides 118), it is possible to achieve a close packing of pixels. By means of the arrangement of the collimator optical unit 215, it is thus also possible to use large, light-efficient detectors for the light field measurement.

A further possibility for switching back and forth between the laser scanning operating mode 1003 and the light field operating mode 1001 could be implemented by means of a field stop 216 having an aperture having a variable diameter and/or a collimator optical unit 215 designed as a zoom optical unit. The zoom optical unit can be designed, in particular, as an optical unit having a variable focal length, wherein the axial distances between object field—the field stop 216—and image field—the detector plane 118—remain unchanged. Such zooms are embodied for example as at least two-stage zooms, wherein the focal length is varied with one zoom stage and the distance between object plane and pupil plane is kept constant with a further zoom stage. The zoom optical unit can be designed for example conventionally by means of axially displaceable lens groups or with laterally movable aspherical elements.

The light field operating mode 1001 and the laser scanning operating mode 1003 can be used in synergistic combination. By way of example, a spatial imaging of the object 250 can also be generated in the laser scanning operating mode 1003. This can be done e.g. by displacing the pinhole stop 117 along the z-direction or by varying the focal plane of the objective 211 or by varying the relative axial position of the object 250 by means of a relative movement between objective 211 and object 250. A measurement duration for achieving the spatial imaging of the object by means of the laser scanning operating mode 1003 can typically be comparatively long, in particular longer than the measurement duration for the light field operating mode 1001. In return, however, a depth resolution can be comparatively high. Therefore, it may be worthwhile to enable a coarse selection of a specific z-range on the basis of the spatial imaging generated by means of the light field operating mode 1001 and to restrict the generation of the spatial imaging by means of the laser scanning operating mode 1003 to said specific z-range. By way of example, via the user interface 105, the user could obtain a 3D overview image on the basis of the light field operating mode 1001 and select a specific measurement region there. For this purpose, the user can move and zoom e.g. digitally in three dimensions through the object 250 and focus specific regions. A spatial imaging with a particularly high resolution can then be generated by means of the laser scanning operating mode 1003 for this measurement region. For light-sensitive samples this has the advantage that the exposure to light can be reduced.

Figure 9:
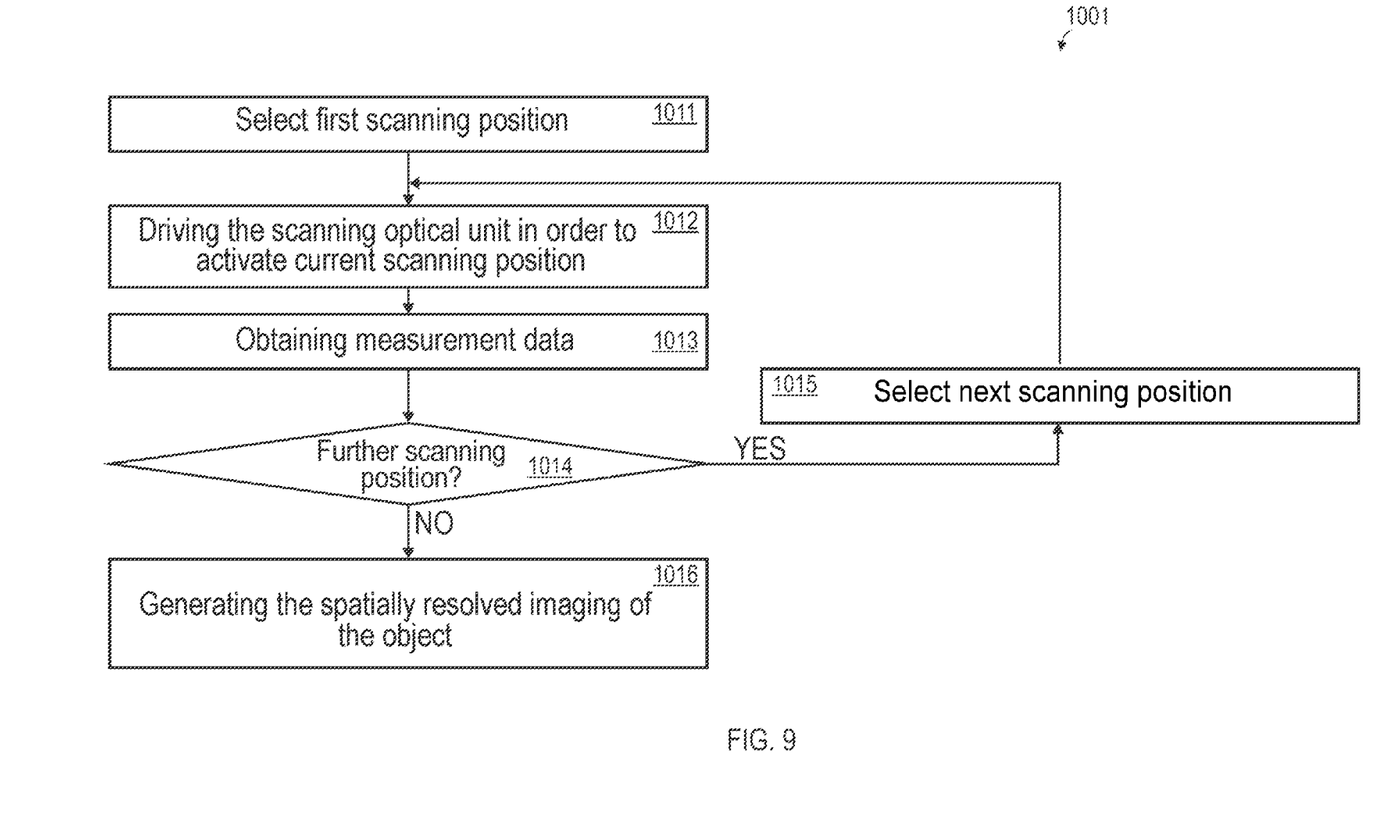
FIG. 9 is a flow diagram of a method in accordance with various exemplary embodiments.

FIG. 9 illustrates details concerning a method in accordance with various embodiments. In particular, FIG. 9 illustrates details concerning the light field operating mode 1001. Firstly, a first scanning position 290 is selected, 1011. Said first scanning position 290 is adopted as the current scanning position 290, and the scanning optical unit 122 is subsequently driven in order to activate the current scanning position 290, 1012. This can comprise tilting one or more scanning mirrors 115, 115-1, 115-2, such that light from a specific angular range is directed onto the detector 118.

The pixels of the detector 118 are then read for the active scanning position 290, in order to obtain corresponding measurement data, 1013.

Afterwards, a check is made to ascertain whether measurement data are required for a further scanning position 290, 1014. If this is the case, then a next scanning position is selected, 1015; the latter is adopted as the current scanning position 290. Afterwards, steps 1012-1014 are carried out again with the new current scanning position 290.

By way of example, the scanning positions 290 can be determined flexibly. The scanning positions 290 can be determined e.g. on the basis of a desired spatial resolution of the spatial imaging of the object 250. A larger (smaller) spatial resolution can typically correspond to a larger (smaller) number of scanning positions 290.

If it is established in 1014 that measurement data are not required for further scanning positions 290, in 1016 the spatially resolved imaging of the object 250 is generated. For this purpose, it is possible to use reconstruction techniques such as were described above for example in association with FIGS. 1-3. However, other reconstruction techniques are also conceivable. In particular, the spatially resolved imaging of the object 250 comprises a plurality of images corresponding to different object planes of the object 250. In this case, the different object planes can be at a particularly large distance from one another, which in particular is greater than a depth of field defined, for example, by the imaging optical unit 121, 211.

Optionally, before step 1011 the field stop 216 can be driven in order to set a diameter of the aperture of the field stop 216 (not illustrated in FIG. 9). The diameter of the aperture can be determined e.g. depending on the desired depth resolution of the spatial imaging.

To summarize, techniques were described above which make it possible to carry out light field imaging without the use of a microlens array. The techniques described herein are based on the use of a scanning optical unit which makes it possible, for different scanning position in, in each case to direct light from different angular ranges onto the detector. As a result, the parallel scanning of the different angular ranges that is achieved by means of the microlens array is replaced by a serial scanning. This makes it possible to provide a particularly high spatial resolution of the images from the different object planes for the spatial imaging. Furthermore, by means of such techniques it may be possible to use for example large detectors having a smaller number of pixels; this may make it possible to use photomultipliers having a particularly high sensitivity. Moreover, by means of the techniques described herein it may be possible to integrate the optics for light field imaging into a laser scanning microscope.

It goes without saying that the features of the above-described embodiments and aspects of the invention can be combined with one another. In particular, the features can be used not only in the combinations described, but also in other combinations or by themselves, without departing from the field of the invention.

What is claimed is:

1. An optical device for light field imaging, wherein the optical device comprises:
    a light source configured to emit light along an optical path,
    a detector,
    a sample holder, which is arranged in the optical path downstream of the light source and upstream of the detector and which is configured to fix an object in the optical path of light,
    a scanning optical unit, which is arranged in the optical path downstream of the sample holder and upstream of the detector and which is configured, for each of a multiplicity of scanning positions, selectively to direct light incident from different angular ranges from the object onto the detector,
    wherein the detector is configured to detect measurement data for each of the multiplicity of scanning positions, and
    a computing unit, which is coupled to the detector and which is configured, on the basis of a three-dimensional light field represented by the measurement data of the multiplicity of scanning positions to generate a spatially resolved imaging of the object that comprises at least two images from different object planes of the object;
    wherein the optical device furthermore comprises a field stop arranged in an image plane of the scanning optical unit;
    wherein the optical device furthermore comprises a collimator optical unit,
        wherein the collimator optical unit is arranged in the optical path downstream of the scanning optical unit and upstream of the detector,
        wherein the collimator optical unit is configured in each case to focus the angular ranges of the light which passes through a field stop onto a pixel of the detector,
        wherein the optical device comprises a movable stage, which is movable between a first position and a second position,
        wherein the collimator optical unit is coupled to the movable stage,
        wherein the collimator optical unit is positioned in the optical path in the first position of the movable stage,
        wherein the collimator optical unit is not positioned in the optical path in the second position of the movable stage,
        wherein the field stop is coupled to the movable stage,
        wherein the field stop is positioned in the optical path in the first position of the movable stage, and
        wherein the field stop is not positioned in the optical path in the second position of the movable stage.

2. The optical device according to claim 1, which furthermore comprises:
    an imaging optical unit, which is arranged in the optical path and which brings about an imaging of the object with a depth of field,
    wherein the object planes of the at least two images are at a distance from one another that is greater than the depth of field.

3. The optical device according to claim 1,
    wherein the detector comprises a photomultiplier, and
    wherein the photomultiplier comprises a multiplicity of pixels.

4. The optical device according to claim 3,
    wherein the detector comprises, for each pixel of the photomultiplier, an optical waveguide having a first end facing the sample holder and a second end facing the respective pixel.

5. The optical device according to claim 1,
    wherein the collimator optical unit is of aplanatic design.

6. The optical device according to claim 1,
    wherein the detector is arranged in the focal plane of the collimator optical unit facing away from the object.

7. The optical device according to claim 1,
    wherein the collimator optical unit is designed as a zoom optical unit, and
    wherein the zoom optical unit is configured to image the angular ranges of the light with variable focal length onto the detector.

8. The optical device according to claim 1,
    wherein an aperture of the field stop and the multiplicity of the scanning positions are configured in such a way that at least two scanning positions have overlapping field regions.

9. The optical device according to claim 1,
    wherein an aperture of the field stop and the multiplicity of the scanning positions are configured in such a way that the multiplicity of the scanning positions have no overlapping field regions.

10. The optical device according to claim 1,
    wherein an aperture of the field stop has a variable diameter in at least one direction.

11. The optical device according to claim 1,
    wherein the field stop has a diameter that is in the range of 2-20 Airy units.

12. The optical device according to claim 1,
    wherein the optical device is designed as a laser scanning microscope.

* * * * *

UNITED STATES PATENT AND TRADEMARK OFFICE
CERTIFICATE OF CORRECTION

PATENT NO. : 10,371,932 B2
APPLICATION NO. : 15/374319
DATED : August 6, 2019
INVENTOR(S) : W. Singer et al.

Page 1 of 1

It is certified that error appears in the above-identified patent and that said Letters Patent is hereby corrected as shown below:

In the Specification

Column 6, Line 26, please change "pixel of the, an" to -- pixel, an --

Column 13, Line 57, please change "stop 126" to -- stop 216 --

Column 14, Line 2, please change "stop 126" to -- stop 216 --

Column 14, Line 58, please change "stop 116" to -- stop 216 --

Column 15, Line 7, please change "converging lens 118" to -- converging lens 119 --

Column 15, Line 13, please change "implementation, the" to -- implementations, the --

Column 15, Line 28, please change "waveguides 118)," to -- waveguides), --

Signed and Sealed this
Thirty-first Day of December, 2019

Andrei Iancu
*Director of the United States Patent and Trademark Office*